United States Patent

McKinley et al.

(10) Patent No.: US 6,735,324 B1
(45) Date of Patent: May 11, 2004

(54) DIGITAL WATERMARKS AND TRADING CARDS

(75) Inventors: Tyler J. McKinley, Lake Oswego, OR (US); Marc D. Miller, Fairfax, CA (US); J. Scott Carr, Beaverton, OR (US); William Y. Conwell, Portland, OR (US)

(73) Assignee: Digimarc Corporation, Tualatin, OR (US)

(*) Notice: Subject to any disclaimer, the term of this patent is extended or adjusted under 35 U.S.C. 154(b) by 0 days.

(21) Appl. No.: 09/630,243

(22) Filed: Jul. 31, 2000

(51) Int. Cl.⁷ .............................. H04K 1/00; A63F 1/00
(52) U.S. Cl. .................... 382/100; 273/292; 463/43
(58) Field of Search ................. 273/292, 293, 273/296, 297, 298, 308; 283/72, 74, 79, 85, 93, 113, 901, 902; 382/100, 232; 380/210, 252, 287, 51, 54; 713/176; 399/366; 463/1, 40, 42, 43

(56) References Cited

U.S. PATENT DOCUMENTS

| | | | |
|---|---|---|---|
| 5,026,058 A | * 6/1991 | Bromley | 273/93 C |
| 5,411,259 A | * 5/1995 | Pearson et al. | 273/93 C |
| 5,517,336 A | 5/1996 | Moleé | 359/1 |
| 5,533,124 A | * 7/1996 | Smith et al. | 380/4 |
| 5,617,119 A | 4/1997 | Briggs et al. | 345/611 |
| 5,689,561 A | * 11/1997 | Pace | 380/4 |
| 5,743,801 A | * 4/1998 | Welander | 463/44 |
| 5,748,731 A | * 5/1998 | Shepherd | 380/4 |
| 5,810,666 A | * 9/1998 | Mero et al. | 463/42 |
| 5,825,892 A | 10/1998 | Braudaway et al. | 380/51 |
| 5,902,353 A | 5/1999 | Reber et al. | 709/219 |
| 5,933,798 A | 8/1999 | Linnartz | 702/191 |
| 5,940,595 A | * 8/1999 | Reber et al. | 395/200.57 |
| 5,956,877 A | 9/1999 | Raasch et al. | 40/702 |
| 5,959,281 A | * 9/1999 | Domiteaux | 235/454 |
| 5,974,548 A | 10/1999 | Adams | 713/200 |
| 5,982,736 A | * 11/1999 | Pierson | 369/273 |
| 6,082,774 A | 7/2000 | Schlauch | 283/67 |
| 6,200,216 B1 | * 3/2001 | Peppel | 463/1 |
| 6,256,398 B1 | * 7/2001 | Chang | 382/100 |
| 6,309,690 B1 | 10/2001 | Brogger et al. | 427/7 |
| 6,332,031 B1 | 12/2001 | Rhoads et al. | 382/100 |
| 6,449,377 B1 | 9/2002 | Rhoads | 382/100 |
| 2002/0155893 A1 | * 10/2002 | Swanberg et al. | 463/43 |

FOREIGN PATENT DOCUMENTS

| | | | | |
|---|---|---|---|---|
| WO | WO-97/43736 A1 | * 11/1997 | | G06K/9/36 |
| WO | WO00/07356 A2 | 2/2000 | | H04N/1/00 |
| WO | WO00/26749 A1 | 5/2000 | | G06F/1/00 |

OTHER PUBLICATIONS

"Overlay Plug–In User's Guide," Plug–in Systems, 1996, 12 pages.*
"Overlay Plugin for Packagizer™," Plug–In Systems brochure, 1 page, undated.*
"Digimarc Turns Online Images into Powerful Marketing Agents," Digimarc press release, Jul. 20, 1998, 3 pages.*
Alattar, "'Smart Images' Using Digitmarc's Watermarking Technology," Proc. SPIE vol. 3971: Security and Watermarking of Multimedia Contents II, Jan. 24–26, 2000, pp. 264–273.*

(List continued on next page.)

Primary Examiner—Andrew W. Johns
(74) Attorney, Agent, or Firm—William Y. Conwell; Digimarc Corporation

(57) ABSTRACT

Digital watermarks can be employed in conjunction with trading cards (e.g., baseball cards, fantasy game cards, etc.) to serve a variety of purposes. Among these are facilitating on-line collecting and game-play. Digital watermarks may also be used in distinguishing genuine cards from counterfeits.

11 Claims, 1 Drawing Sheet

OTHER PUBLICATIONS

McDonald, "Making a MARC: Digimarc's MediaBridge fastens print advertising to the Internet," *Publishing & Production Executive,* vol. 14, No. 6, Jun. 2000, pp. 40, 42 and 44.*

Zhao et al., "In Business Today and Tomorrow," *Communications of the ACM,* vol. 41, No. 7, Jul. 1998, pp. 67–72.*

Acken, "How Watermarking Adds Value to Digital Content," *Communications of the ACM,* vol. 41, No. 7, Jul. 1998, pp. 75–77.*

Yeung et al., "Digital Watermarks: Shedding Light on the Invisible," *IEEE Micro,* vol. 18, No. 6, Nov./Dec. 1998, pp. 32–41.*

"1999 NFL Rookies Featured in Upper Deck's PowerDeck Lineup," Upper Deck press release, Aug. 17, 1999, 2 pages.*

"Newly Released Magic: The Gathering Interactive Encyclopedia CD–ROM Makes Every Magic Card Ever Printed Available for Electronic Play," Wizards of the Coast press release, Nov. 10, 1999, 2 pages.*

* cited by examiner

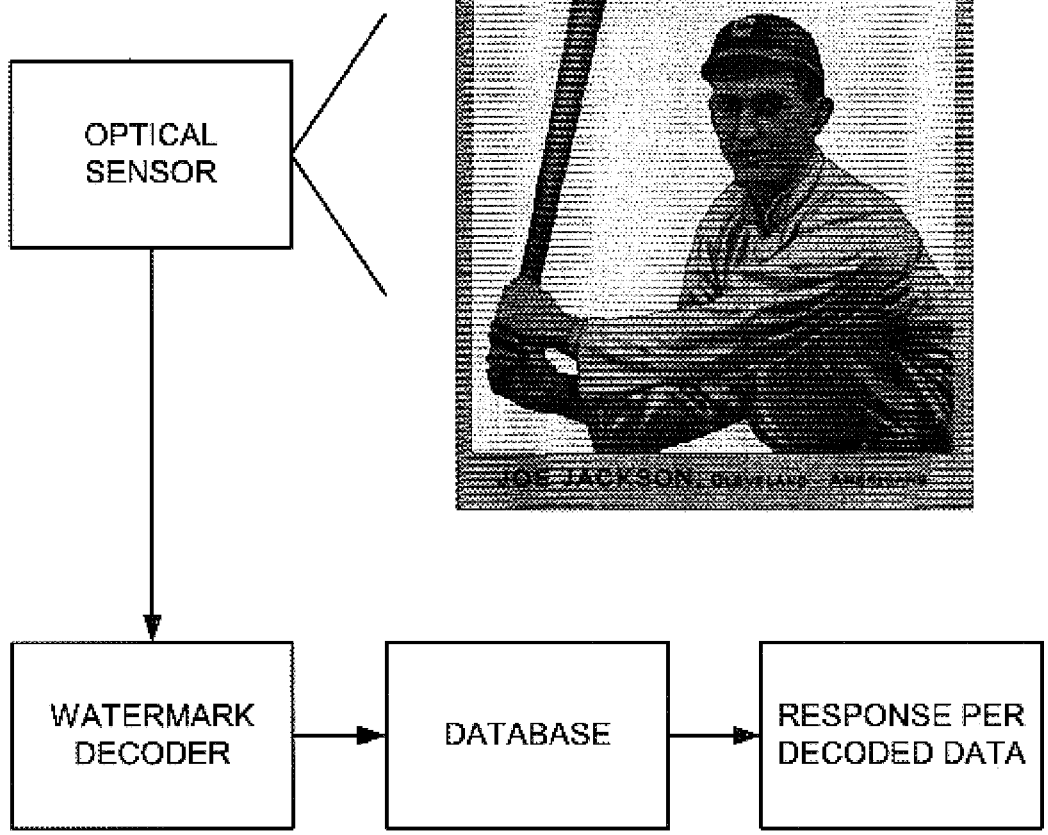

DIGITAL WATERMARKS AND TRADING CARDS

FIELD OF THE INVENTION

The present invention relates to baseball cards and the like, and more particularly relates to enhancements to such cards, and their use, that can be provided by digital watermark technology.

BACKGROUND AND SUMMARY OF THE INVENTION

For decades, baseball cards have consisted of player photos with associated statistics; nothing more. Recently, however, card vendors have begun looking beyond the strictly paper realm, and have started providing collectables with various interactive features.

For example, Upper Deck—one of the leading card vendors—recently announced PowerDeck—an interactive CD in a trading card form-factor and distributed in packs with other cards, that features video footage, music, and photos of star NBA athletes.

Similarly, Upper Deck has introduced baseball cards with Internet tie-ins. "E-Cards" are included in selected packs of baseball cards and are each printed with a unique 9 digit identifier number. The cards invite collectors to visit upperdeckdigital.com, and "digitize" their E-Cards. When the collector signs onto the specified web site and types-in a card identifier number, an image of the card is entered into a virtual gallery that displays others of the collector's E-Cards. Additionally, the user is invited to click on an "Evolve" icon to see if the card identifier number is one that has been selected to win a prize. (Prizes include baseball cards with autographs, baseball cards with fragments of famous bats, baseball cards with swatches of famous player jerseys, and other sports memorabilia.)

Card quality has also been upgraded over the years. No longer are cards simply lithographed on inexpensive stock. Increasingly, card manufacturing is a sophisticated undertaking employing advanced manufacturing techniques and various anti-counterfeiting measures (e.g., laminate construction, intaglio printing, holograms, etc.)

Likewise, the subject matter of trading cards has evolved. No longer are cards limited to baseball and football. In addition to other sports (e.g., NASCAR auto racing and hockey), collectable cards now include game cards (e.g., Pokemon and Digimon), music group cards (e.g., InSync, Backstreet Boys), etc., etc. (For expository convenience, the present specification generally focuses on baseball cards, but it should be understood that the disclosed technology is equally applicable to all manner of trading cards.)

The present invention continues the technological advancement of trading cards, and their use.

For example, in one embodiment a trading card includes a steganographic digital watermark. When imaged by a web-connected camera, the card directs a web browser to an internet site corresponding to that card. At the site the user is presented with a variety of information and e-commerce opportunities related to that trading card and the depicted player. For example, the user may review expanded player stats, watch a video clip interview of the player, view clips of famous plays, send email to the player, obtain recent EBay auction prices for that card, link to fan sites or the Major League Baseball site for that player, order tickets for upcoming games, purchase replicas of that player's game jerseys, etc., etc.

(Digital watermark technology, per se, is detailed in a large body of patent literature, including the present assignee's U.S. Pat. No. 5,862,260 and copending application Ser. No. 09/503,881, filed Feb. 14, 2000.)

Other embodiments of the present invention include watermark-based anti-counterfeiting measures, watermark-based promotional contests, watermark processing of packaging, and a great variety of other improvements.

The foregoing and additional features and advantages of the present technology will be more readily apparent from the following detailed description.

BRIEF DESCRIPTION OF THE DRAWINGS

FIG. 1 shows an illustrative embodiment according to the present invention.

FIG. 2 shows a data structure that can be used in conjunction with the FIG. 1 embodiment.

DETAILED DESCRIPTION

The use of digital watermarks to link to the Internet from both physical and electronic objects is detailed in copending application Ser. No. 09/571,422, filed May 15, 2000, the disclosure of which is incorporated herein by reference. One common technique for implementing such Internet linking uses software at a user computer to process image data acquired from a webcam or the like, and decode an object identifier steganographically encoded within the image data. This identifier is passed to a remote server computer and indexes a database that provides a web address corresponding to that identifier. This web address is returned to the user computer and is used by a web browser program to download and display the identified web page.

As noted, one embodiment of the present invention embeds a watermark in a trading card, permitting the physical card to serve as a portal to web resources related to the card, or the depicted player. Examples of web resources that may be linked in this fashion to a trading card include expanded player stats, video interviews with the depicted player, video clips of famous plays, the opportunity to send email to the player, recent EBay auction prices for that card, links to fan sites or the Major League Baseball site for that player, and various commerce opportunities including the opportunity to purchase tickets for upcoming games and to purchase game apparel associated with the player or his team.

The embedding can be done by slightly changing the artwork on the front (and optionally the back) of the card to effect local variations in luminance or reflectivity. Alternatively, the encoding can be effected by processing a laminate layer that is applied over the artwork so as to change the luminosity or reflectance as necessary to encode the desired information. Still further, the card can be textured to convey the watermark.

In most cases, all cards of the same player include the same watermark, and thus link to the same destination. In some cases, however, it may be desirable for a card to be specially marked in a manner different than all other, seemingly identical, cards. Finding this specially encoded card can entitle the owner to a special prize, or qualify the person for entry into a drawing for a prize.

In still other applications, every card can bear a unique watermark (even apparently identical cards).

The concept of collecting cards, and trading with other collectors, may eventually expand into the digital realm. Digital cards may be purchased on-line, much like stock photos, and added to a personal gallery of cards. (A digital card may take the form of a web page, or other digital object.) Or a digital card may be issued to a user when a corresponding physical card is presented to a web-cam. If every physical card is serialized with a unique watermark, then the privilege of receiving a digital card may be a one-time opportunity. When the card is first presented, a corresponding digital card is added to the user's collection. If the same card is thereafter presented, no further digital card is issued. This keeps the number of digital cards from proliferating out of proportion to the number of paper cards, ensuring some collectable value. If a collector wants a digital card to complete a collection, that card will have to be issued by the vendor, or taken out of someone else's collection (e.g., by purchase or trade).

The digital cards can be protected against duplication. A variety of copy protection arrangements suitable for use with digital imagery and web pages are known. Among these are product offerings by SecureView and Vyou.

Digital cards may be watermarked in various fashions. One is in the same manner as paper cards—pointing to web resources associated with a card or the depicted player. Another is with an identifier (typically unique) that is associated (through the database) with the collector to whom the card was first issued.

While traditional, physical, prizes can be awarded in web-based trading card promotions (e.g., card packs, event tickets, bat fragments, jersey swatches, and other memorabilia), other types of prizes can be awarded too. One is a hosted web page assigned to a particular collector. Digital cards issued to that collector can have a watermark that points (through the database record corresponding to the watermark payload) to that collector's page. (If a digital card is later sold or traded, the watermark payload embedded in that card may be re-associated in the database so that it points to the new custodian. Or the pointer to the original owner may be maintained.) The web page can be used for a variety of purposes, including posting lists of cards for sale or trade, presenting personal information such as favorite links, displaying galleries of cards, etc. The web site may have a limited life (e.g., 3 months), after which a renewal fee may be charged to keep the page active. (Renewals may be awarded as further promotions.)

One type of promotion was referenced earlier—the specially-marked card. A great variety of other promotions can likewise be utilized. One variant awards a prize on random hits to the database. Another awards a prize every Nth person (e.g., every 5000$^{th}$) who links from a card (physical or digital), through the database, to a web site. Customer-loyalty programs can similarly be implemented, awarding incentives and prizes to collectors who are high-volume users of a company's web site (or lead others to the site).

Not just cards, but card packaging too, can be watermarked. Thus, prizes can be based on links from exterior packaging rather than just from the cards themselves.

As discussed in the cited '422 application, watermarked objects can be used to provide gesture data to a computer system, controlling in some manner the system's operation. Trading cards are of a convenient size for this purpose. Moving the card towards the camera may trigger a first response; moving the card away may trigger a second response. Likewise, rotating the card clockwise or counterclockwise, or pivoting the card on an axis extending therethrough, can trigger still other mechanisms.

One application of this gestural input is to examine a baseball or golf swing of a favorite player in more detail. A video clip of the player may be controlled in speed (including stop-action) and direction by moving the card. Moving the card in one direction may cause the video to advance. Moving the card in the opposite direction may cause the video to play in reverse. Holding the card stationary during such manipulation may cause the video to freeze.

By encoding both the front and back of the card, increased gestural input can be expressed. Showing the front of the card can invoke one function; showing the back can invoke another. Similarly, holding the card sideways and upside down can result in different responses, made still more different depending on whether the front or back of the card is facing the camera.

While the gestural functionality of the card can be explained to the user through instructions, FAQs, and the like, some such information can be left undisclosed—left to the curious user to discover on their own (e.g., gestures leading to obscure web pages, etc.). Some such surprises—when discovered—can result in an award of prizes.

The virtual card corresponding to a physical card needn't be limited to a static 2D image. The virtual card can be a video clip, or a 3D model that permit the user to view from any arbitrary x- y- z-viewpoint. These latter objects may be issued in pieces, e.g., a video clip of Mark McGwire's 70$^{th}$ homerun swing may consist of 50 frames, or a 3D model may consist of 20 individual components. A collector may be issued one piece when the physical card is first presented to a web-cam. Other pieces may be issued as random prizes, or awards for some achievement (e.g., on-line gaming), or may be received by trade or purchase from other collectors. Each piece may be watermarked separately, or they can all share a common watermark.

Such video clips and 3D objects, of course, need not be virtual counterparts to physical cards—they can be obtained otherwise.

Returning to the watermarking of exterior packaging, the link from such media may point to a page at which the package's contents are detailed. Thus, the collector can maintain the package in an un-opened state, while still knowing the contents. The enhanced collectable value of the intact card pack is thus maintained.

Additional opportunities arise in the field of cards for game playing. Pokemon and Magic: The Gathering are examples of games that are conventionally played by two or more persons, with cards spread out on a table between them. Such games can be extended into on-line domains by use of watermarking. Each card bears a watermark permitting its identification by a computer. A player can show each card in their deck to a webcam. A suitable software program can decode the watermark, query a remote database for an image of the corresponding card, and enter it into a virtual deck maintained for the player—either on the player's own computer or on a remote server. Game playing software (local, or running on a remote server) can provide customary functions, such as setting up on-line matches, inviting players, shuffling and distributing cards, indicating which cards are to be face-up and which are to be face-down, etc. During game playing, a virtual table-top is shared among on-line players, with each player's cards displayed. When a player wants to manipulate a card on the table, a point-and-click interface or the like is utilized. As new cards are acquired, they can be shown to the player's webcam and added to that player's virtual deck. Dice, chips, tokens, and other ancillary playing pieces can be readily simulated in the virtual gaming environment, together with animations, graphics, etc., that can enhance the experience of fantasy role-playing games.

Again, if each card bears a unique watermark (including cards that are seemingly the same), then the virtual counterparts to the physical cards can be taken in conquest as part of the on-line game. Thus, a player may own a desirable, rare physical card and a virtual counterpart. During the course of on-line game play, the virtual counterpart may be lost to another player. In such case, a registry entry in a centralized database assigns ownership of the card to the new player. The original player thereafter still has the physical card, but no longer has the virtual counterpart. (Again, this assumes that a virtual counterpart can only be issued once from a physical card.)

In some cases, the value of a physical card will doubtless depend on whether the virtual counterpart is still latent (i.e., has not been created from the physical card), whether it is commonly owned by the custodian of the physical card (and thus may be transferred as part of the transaction), or is owned by a third party. (The registry database that tracks ownership of virtual cards desirably includes a user interface permitting owners of virtual cards to voluntarily reassign virtual cards to other custodians.)

The gestural concepts detailed above can also be employed in game playing applications, either for rote control of game play, or as an aspect of skill (e.g., players are aided by having good card manipulation skills.)

It should be noted that watermarks permit game use of cards that traditionally are not associated with gaming. Baseball cards, for example, have not traditionally had a game playing function. But by watermarks that provide control and communication functions, baseball cards can be used, e.g., in on-line fantasy baseball games, etc.

In many cases it may be desirable to print-out virtual cards. Again, watermarks can come into play. One option is to embed in the printed card a watermark identifying the virtual card's current custodian. Another is to embed in the printed card the watermark originally provided in the physical version of the card. Desirably, however, means should be provided to prevent such a printed-out card from spawning still more virtual counterparts. If a centralized registry database tracks the one-time issuance of virtual cards, then such a printed-out card—like the original physical card—will be unable to spawn other virtual cards. In other cases, a flag bit may be set in the printed-out card's watermark payload, indicating that the card is a printed-out version—not an original. (Such data in the watermark indicating a printed card is not an original may be advantageous in other contexts as well.) Another option is to encode a unique identifier in the watermark payload of the printed-out copy, and to log data about such card in the centralized database (e.g., when printed, by whom, from what virtual card copy, etc.)

The use of watermarks to distinguish original cards from player-made copies also extends to distinguishing original cards from professionally-made counterfeits. Counterfeiting is a problem when cards experience explosive demand—as happened with Pokemon cards. Various technical measures have been employed to discourage counterfeiting—such as the holograms and intaglio printing mentioned earlier. Watermarks can supplement these technical measures.

As detailed in copending application Ser. No. 09/433,104 (filed Nov. 3, 1999), an object (e.g., a printed document) can be provided with a watermark that is designed to be lost, or become impaired in predictable ways, when copied. Such a so-called "frail" watermark can be included in trading cards (either alone, or in conjunction with other watermarks), permitting original cards to be discerned from even genuine-looking counterfeits. This checking is done by use of a suitably-configured watermark detector that looks for the frail watermark, and reports whether it appears to correspond to an original. (The same approach can likewise be employed with the cards' packaging—so that card packs might be flagged as counterfeits without opening the packages.)

Such authenticity-checking watermark readers may be employed in trading contexts, where one trader is confirming authenticity of a card to another trader. This function may be provided locally, e.g., as a utility on a collector's computer, or by a web-accessible interface that passes image data from a user's camera, processes it to assess the frail watermark, and reports a the results back. The results may also be forwarded to a specified recipient (e.g., the other party in a trade or auction).

In some such security applications of watermarks, the watermarking can be done out of the visible spectrum, e.g., by inks that respond to UV or IR illumination.

Frail watermarks may be included in printed-out versions of virtual cards, but are typically omitted—so as to facilitate differentiating original cards from user-made print-outs. (One example where a frail watermark may be included in a printed-out card is where the printed-out card is, itself, collectable. This may arise, for example, if the virtual card is in the collection of a celebrity, and print-outs of the card from that celebrity's collection are sought-after. If a copy is thereafter made from such a print-out, the absence or change in the fragile watermark will permit the original print-out to be distinguished from a copy.)

From the foregoing, it will be recognized that watermark technology offers opportunities to significantly enhance the functionality, collectability, and authenticity of large categories of trading cards.

To provide a comprehensive disclosure without unduly lengthening this specification, applicants incorporate by reference the patents and applications cited above.

Having described an illustrated the principles of our invention with reference to specific embodiments, it will be recognized that the principles thereof can be implemented in many other, different, forms. (For example, indicia other than watermarks may be used, e.g., bar codes, magnetic ink, RFID, etc., and the sensing device(s) can be tailored accordingly.) Moreover, the particular combinations of elements and features in the above-detailed embodiments are exemplary only; the interchanging and substitution of these teachings with teachings in the incorporated-by-reference applications are also contemplated.

We claim:

1. A trading card comprising a substrate and an image formed thereon, wherein the card conveys a frail steganographic watermark representing plural-bit digital data, the frail watermark permitting a copy of the card to be differentiated from the original.

2. The card of claim 1, formed by a user printing-out a virtual card image corresponding thereto.

3. The card of claim 2 wherein the user is associated with said card by reference to the plural-bit digital data.

4. The card of claim 1 wherein the trading card has a sports player depicted thereon, and the digital data serves as an index to a data repository, said data repository having stored therein information relating to a particular card collector or custodian.

5. A method of playing a fantasy role-playing game involving playing cards, wherein:

at least one of said cards conveys a plural-bit steganographic watermark;

a first player presents a watermarked card to an optical input device, and is issued a virtual card corresponding thereto; and the game provides for the conquest of said virtual card by a second player, and its consequent loss by the first player.

6. The method of claim 5 that further includes maintaining a database record indicating current ownership of the virtual card in a registry database.

7. A trading card comprising a substrate and an image formed thereon, wherein:

the card conveys a steganographic watermark representing plural-bit digital data, the trading card has a sports player depicted thereon; and the digital data serves as an index to a data repository, said data repository having stored therein information comprising at least the following, or a hyperlink to at least the following: recent auction prices relating to said trading card.

8. A method comprising:

issuing a trading card comprising a substrate and an image formed thereon, the card conveying a steganographic watermark representing plural-bit digital data;

receiving data from a first custodian of the card when said first custodian presents the card to a system equipped with an optical image sensor and the system decodes the plural-bit digital data from the steganographic watermark; and entering information in a database that associates said card with said first custodian, said information including electronic address data corresponding to an internet resource associated with said first custodian.

9. The method of claim 8 that further includes receiving data from a second, different, custodian of the card when said second custodian presents the card to a system equipped with an optical image sensor and the system decodes the plural-bit digital data from the steganographic watermark.

10. The method of claim 9 that includes entering information in said database that associates said card with the second custodian, said information including electronic address data corresponding to an internet resource associated with said second custodian.

11. The method of claim 8 wherein the plural-bit digital data also includes serialization data, wherein cards that appear—to human inspection—to be identical, convey serialization data by which they can be distinguished.

* * * * *